Aug. 9, 1966     P. E. BOXRUD     3,264,877
SOIL SAMPLING DEVICE
Filed Aug. 17, 1964
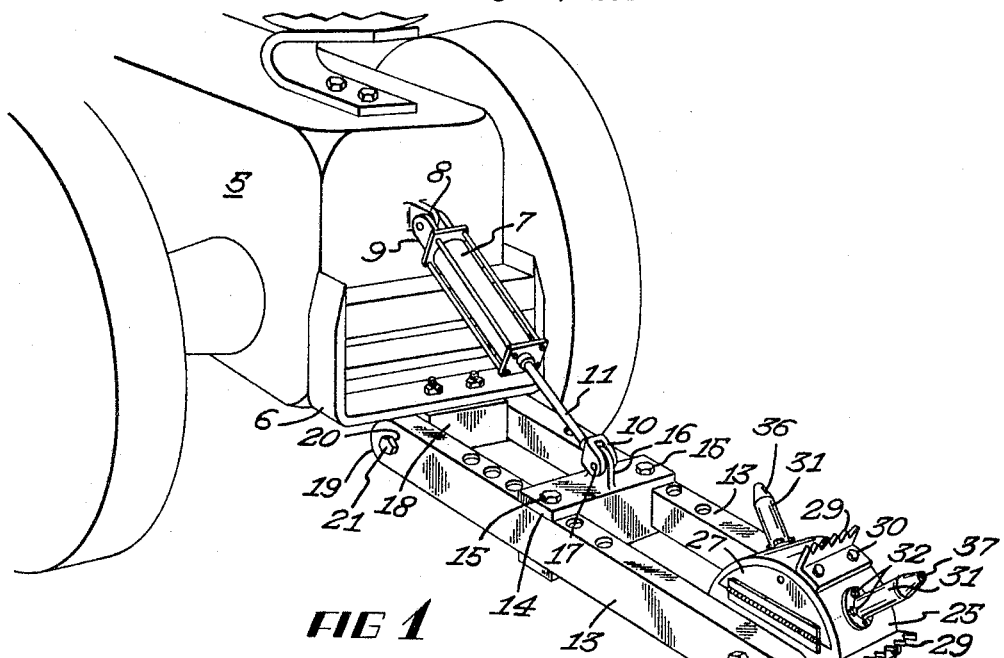
FIG 1
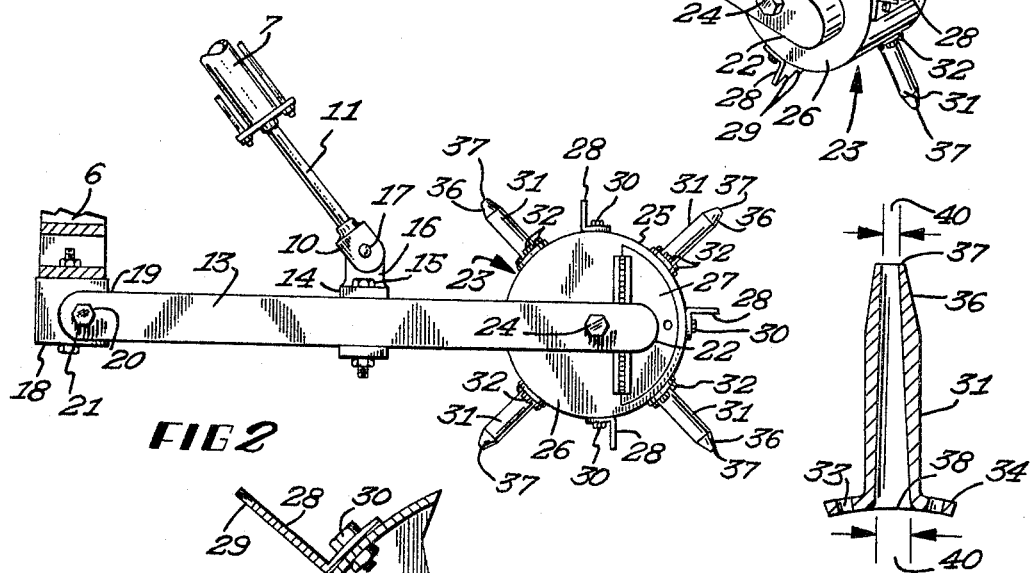
FIG 2
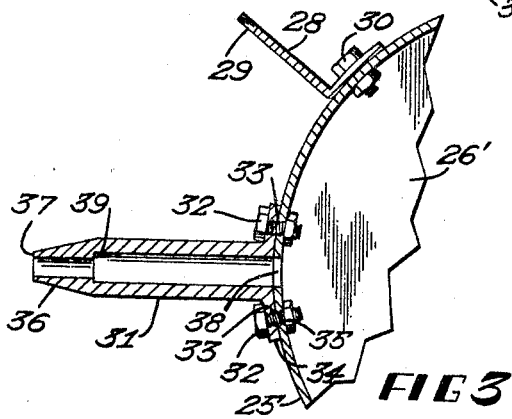
FIG 3
FIG 4
INVENTOR.
PHILLIP E. BOXRUD
BY
David H. Kilgore
ATTORNEY

United States Patent Office 3,264,877
Patented August 9, 1966

3,264,877
SOIL SAMPLING DEVICE
Phillip E. Boxrud, Madelia, Minn.
Filed Aug. 17, 1964, Ser. No. 390,139
9 Claims. (Cl. 73—421)

This invention relates broadly to soil sampling devices; more particularly to a device used for the purpose aforesaid; and specifically to a device of the class described that automatically takes samples of soil quickly, thoroughly, and easily when said device is towed over a parcel of land to be sampled by a prime mover such as a tractor, truck, or utility vehicle.

The principal object of this invention is to provide a device that will automatically take a plurality of soil samples from a given strata in a land parcel, and agglomerating the same to provide a composite soil sample.

A further object of this invention is to provide a device that will automatically take a plurality of soil samples intermittently at a predetermined depth from a given parcel of land.

A still further object of this invention is to provide a soil sampling device that will quickly, thoroughly, and easily produce a soil sample from a given parcel of land without involving any laborious, time consuming, manual labor.

Still another object of this invention is to provide a soil sampling device to be towed over a given parcel of land by a prime mover wherein said device is secured to the said prime mover in such a manner as to provide for raising and lowering movements of the same out of and into soil engagement as well as towing movements imparted by said prime mover.

It is well known in the field of agronomy—that branch of the field of agriculture dealing with the production of crops and the treatment of soil—that the types of soil and climate in a given area, determine to a great extent, the kind of farming and the various crops that can be successfully grown at such location. Within any given area there are many kinds of soil having certain properties that require different land practices based on the residual and natural level of fertility. Because of these inherent variations, soil analyzing has become a highly specialized field of endeavor for the chemical and fertilizer industry. Through research and experimentation these specialists have come to know what to expect of different types of soils and how to best supplement each particular type to produce maximum yields of crops.

A good laboratory soils test and recommendation is primarily predicated on a reliable soils sample and said test and recommendation is only as reliable and accurate as the composite sample taken from the soil strata. Conversely, a poor soils sample can result in recommendations which are misleading to the producer and can cause lower yields due to the improper use of supplements.

Before my discovery of the subject invention, the conventional method of taking soils samples has been by the use of a clean bucket and a spade or by the use of a simple soil auger. Such methods are laborious, expensive, and time consuming and to say the least, not always reliable as the sampling operation is in such instances always subject to the element of error on the part of the sampler.

Therefore, to overcome the many deficiencies of this rather archaic outdated method of soils sampling, I have invented the following device to automatically, thoroughly, and easily obtain reliable, accurate, soils samples from a given land parcel of the same strata.

This device is towed by a prime mover over the land to be sampled and is raised and lowered out of and into soils engagement intermittently by the operator of the prime mover, thereby collecting, storing, and agglomerating individual samples of soil which are periodically removed from the soil sampling device, labeled and sent to a soils testing laboratory for analysis resulting in recommendations for soil supplements.

These and other objects of the invention will become apparent from the following specification and claims when taken in conjunction with the appended drawing which forms a part of this application, and in which drawing, like characters indicate like parts throughout the several views.

To the above end, generally stated, the invention consists of the following devices and combination of devices hereinafter described and defined in the claims.

Referring to the drawing:

FIG. 1 is a perspective view showing the invention secured to a prime mover, a farm tractor fragmentarily shown, for towing and raising and lowering movements.

FIG. 2 is a side elevational view of the invention having a fragmentary showing of the drawbar of the prime mover and a hydraulic ram for raising and lowering the invention out of and into soils engagement.

FIG. 3 is a sectional fragmentary view on an enlarged scale illustrating one form of a soil probe and a traction lug mounted on a cylindrical soil mixing and collecting drum, and, FIG. 4 illustrates another form of soil probe in section detached from its normal mounting station on the cylindrical soil mixing and collecting drum.

Referring now more specifically to the drawing, the reference numeral 5 will hereinafter be directed to the prime mover, which, for the purpose of this application is a farm type tractor. It will be understood, however, that the subject invention is equally well adaptable to use with a prime mover such as a truck, or utility type vehicle having the necessary hydraulic connection and drawbar facilities.

The numeral 6 is directed to the drawbar of the prime and the numeral 7 to a hydraulic ram secured to the tractor 5 by means of a rigid lug 8 having pivotal engagement with a clevis type fitting 9 on the forward or cylinder end portion of the hydraulic ram. For the purpose of this application, in the interest of brevity and clarity, it has not been thought necessary to illustrate the hydraulic lines, connections, and control panel for the hydraulic ram 7 as no inventive concept is involved therein and there are numerous types of mounts and fittings whereby the said hydraulic ram may be connected to the invention and the prime mover. As shown on the drawing, the rear end portion of the hydraulic ram 7 is secured to the invention by means of a clevis type fitting 10 secured to the rear end portion of the piston rod 11 of the hydraulic ram 7 having pivotal engagement with a rigid upstanding lug mounted on the invention proper as will presently appear.

The invention proper comprises a relatively heavy rigid frame having longitudinally disposed laterally spaced side members 13 and a transverse cross-tie member 14 adjustably mounted on the side members 13 of the frame by means of bolts 15 that extend through upper and lower pairs of aligned bores in said frame member to thus afford longitudinal adjustment of the cross-tie member relative to the clevis 10 on the piston rod 11 of the hydraulic ram 7. An upstanding lug 16 having a transverse bore 17 is formed integral with the cross-tie member 14 at the transverse center thereof.

A depending mounting block 18 is rigidly secured to the drawbar 6 of the prime mover 5 and is dimensioned to receive the forward end portion 19 of the laterally spaced side members 13 of the frame. The forward end portions 19 of the frame are provided with aligned bores 20 to receive a long mounting bolt 21 which extends through a bore, not shown, in the mounting block 18 and the bores 20 in the forward end portions 19 of the frame to thus pivotally mount the invention on the prime mover for raising and lowering movements. The mounting block 18 must be very rigidly secured to the drawbar 6 of the prime mover 5 as there is no need for pivotal movements about the horizontal axis of the transverse center of the mounting block 18. It has been found that the invention operates best with this rigid connection to maintain ground engagement.

Mounted between the rear end portions 22 of the side members 13 with a working fit of the frame, is a relatively heavy cylindrical drum 23 which acts as a wheel when the invention is towed by the prime mover, obviously when the invention is in soil engagement. This cylindrical drum 23 is mounted on the side members 13 for rotation about its horizontal axis by means of a long nut-equipped headed bolt 24. Generally speaking, except as will presently appear, this drum 23 has a closed circumferential surface 25 and closed side portions 26 with the exception of a suitably latched access door or port 27 at least in one of said side members to thus afford a collecting and mixing chamber 26' for soil deposited therein. It will be understood that the access door or port 27 may be opened at will to remove mixed composite soil samples collected therein.

To facilitate traction of the drum 23 when the same is in soil engagement, there is provided a plurality of circumferentially spaced lugs 28 having toothed soil engaging edge portions, see numeral 29. These lugs 28 are each removably mounted on the drum 23 by pairs of nut-equipped bolts 30 thus making it possible to replace said lugs when necessary because of wear. It has been found that four of these circumferentially spaced lugs will afford ample traction under most soil conditions.

Circumferentially disposed about the surface 25 of the drum 23 between the traction lugs 28 and at the transverse center of said drum, are four soil probes 31. These soil probes are circumferentially spaced at 90 degrees the one to the other and are detachably secured to the surface 25 of the drum 23 by four nut-equipped bolts 32 that extend through bores 33 in an out-turned flange 34 formed in the lower end portion of the said probes, said bores 33 being aligned with bores 35 formed in the surface 25 of said drum. As in the case of the lugs 28, these probes are detachably mounted to afford easy means for replacement when so dictated by wear.

These soil probes 31 are tubular when viewed in section, see FIGS. 3 and 4, and generally have a constant outside diameter tapering outwardly to a relatively long tapered point 36 having a cutting edge 37, the lower end portion of said soil probes 31 being terminated in the outwardly flared flanged portion 34 and have a radius on the underside conforming with the radius of the drum 23 on which the flanged soil probes are mounted.

Reference to the drawing FIGS. 3 and 4 will reveal that the soil probes 31 are in communication with the interior of the drum 23 by means of a port 38 formed in the surface 25 of the said drum via the hollow tubular interior of said soil probes with which said ports 38 are aligned.

Reference to the soil probe 31 as shown in FIG. 3 will reveal a tubular probe having a relatively narrow passageway or bore extending from its cutting edge 37 to an internal shoulder 39 extending substantially to the depth of the external taper 36. From that point the internal diameter of this probe is increased to facilitate the movement of a core of soil, not shown, taken by the probe to be deposited in the mixing chamber 26' of the drum 23.

FIG. 4 illustrates a soil probe 31 also having a tapered outer end portion 36 and a cutting edge 37, the main body portion of said soil probe 31 being cylindrical and having a constant outside diameter with the exception of its tapered portion 36. Internally, this soil probe has a bore having a constant inwardly diverging taper, see numeral 40, extending from its cutting edge to its junction with the bore 38 in the drum surface 25. It will be understood that this constant taper of the soil probe in question will serve substantially the same purpose as the abruptly increased bore diameter formed in the soil probe 31 illustrated in FIG. 3, and that the lower bore diameter of any soil probe will be substantially the same as the diameter of the port 38 in the surface 25 of the drum 23.

The objects, operation, and intent of this invention have been well covered in the preamble to this specification but with respect to actual operation, to recapitulate: The subject soil probe is transported to a land parcel to be tested either by carrier or out of soil engagement by its own prime mover 5. The area to be tested is thus specified to the operator who will then tow the soil prober over said area with the soil probes 31 in soil engagement each of which takes a new core of soil with each revolution of the drum 23. The cores of soil are automatically deposited in the mixing chamber 26' of said drum where each probe deposited is intermixed with previously deposited soil probes thereby providing a composite sample of soil after removal of the same from the mixing chamber 26' via the latched access door 27. The land area covered to obtain a given sample is identified and so marked on the sample for the purpose of analysis and recommendations for supplemental fertilization and/or treatment for said land area.

For the purpose of turning the prime mover 5 and its attached soil probes, it is important to note that it is necessary to lift the said soil probes out of soil engagement and thence when the turn has been completed, release the action of the hydraulic ram 7 and again force the probes into soil engagement.

While there are herein disclosed but a limited number of embodiments of the structure, process and product of the invention herein presented, it is possible to produce still other embodiments without departing from the inventive concept herein disclosed, and it is desired, therefore, that only such limitations be imposed on the appended claims as are stated herein or required by the prior art.

What I claim is:

1. A soil probing device for taking intermittently spaced samples of soil from a given land area comprising in combination, power means whereby said device is moved over said land area and secondary power means associated with the first noted power means whereby the said device is raised and lowered out of and into soil engagement, a frame pivotally mounted on the first noted power means and a rotatable member having an internal chamber with an access door carried by said frame, soil probing means mounted on the said rotatable member having communication with the internal chamber in the said rotatable member for taking intermittently spaced cores of soil from the ground and automatically depositing the same in said internal chamber and in thence intermixing said cores of soil by the rotating movement of the drum to produce an agglomerated composite soil sample.

2. A soil probing device of the class described for taking intermittently spaced samples of soil from a given land area of the same strata comprising in combination, a frame pivotally and detachably mounted on a prime mover whereby said device, having a rear mounted drum on said frame to afford a wheel is capable of towing movement over said land area by the prime mover, hydraulic means connecting the prime mover and the soil probing device whereby said device may be moved into and out of soil engagement selectively, a hollow chamber within said drum to collect and mix quantities of soil taken at intermittent intervals from said land area of the same strata, and a plurality of elongated soil probes circumferentially spaced and rigidly mounted around the peripheral surface of said drum, said soil probe being tubular to afford a soil passageway therethrough and an open port in the said peripheral surface of the said drum in alignment and communication with the root of each soil probe whereby each soil sample taken by each soil probe is deposited in the chamber of the drum to be intermixed with preceeding soil samples by rotation of said drum.

3. A soils probing device for taking soil samples in the form of a cylindrical core of soil from a given land area, comprising in combination, a frame pivotally mounted at its forward end portion on a prime mover for towing said soils probes over a given land area, a rigid mounting block carried by the drawbar of said prime mover whereby the pivotally mounted frame is towed with a minimum amount of lateral rocking movement, a hollow drum affording a wheel mounted at the rear end portion of said frame, a plurality of circumferentially spaced soil probes mounted on said drum, said probes being tubular and having communication with the hollow chamber of the drum via a port in circumferential surface alignment with each of said soil probes, and a traction lug mounted on the circumferential surface of the drum between each of said soil probes, a hydraulic ram activated by connection from the prime mover secured at one of its end portions to the said prime mover, and at the other end portion to the frame of the soils prober whereby said soils probes may be raised and lowered out of and into soil engagement selectively to facilitate turning movements of the prime mover and the connected soils probes.

4. A soils probing device of the class described for automatically taking soil samples from a given land area of the same strata, said soil samples being in the form of an elongated cylindrical core comprising in combination, a relatively heavy frame having a pair of longitudinally- disposed laterally spaced side members, and at least one transversely disposed cross-tie member rigidly connecting said side members, pivotal means associated with the said frame whereby the same is connected to a prime mover having a drawbar to tow said soils probes over a given land area, a rigid mounting block rigidly mounted on the drawbar of the prime mover affording means to which the laterally spaced forward end portions of the frame are pivotally secured for vertical raising and lowering movements with as minimum an amount of lateral wobble or rocking movement, a hollow drum affording a wheel mounted between the laterally spaced rear end portions of the frame, said drum affording a collecting and mixing chamber for soil samples and an access door in one side portion of said drum whereby composite soil samples may be removed therefrom after being mixed by tumbling action by virtue of the rotation of said drum driving towing movement, a plurality of circumferentially spaced soil probes mounted in equi-distant relation the one to the other on the perihperal surface of said drum, said soil probes being elongated longitudinally and tubular, the outer end portion thereof being outwardly tapered and having a cutting edge on the extreme outer end portion thereof, said soil probes having a flanged inner end portion whereby said soil probes are secured to the peripheral surface of the drum in alignment with a port for each soils probe to afford communication of the tubular interior of the soils probe with the hollow interior of the collecting and mixing drum whereby the said core-like soil samples are forced into the said drum as the respective soil probes intermittently take core-like samples of soil as the soils prober is towed over a given land area by the prime mover, a plurality of traction lugs having serrated outer edge portions secured to the peripheral surface of the drum at equi-distant positions between the said soil probes and a hydraulic ram having operating connections with the prime mover secured at one end portion thereof to the prime mover and at the other end portion thereof to the frame whereby the assembled soils prober may be raised or lowered selectively out of and into soil engagement.

5. The structure of claim 4 wherein the soil probe is formed with a longitudinal passageway the outer end portion of which is of substantially reduced diameter than the inner end portion thereof to thus overcome the frictional drag of core-like soil samples as the same are taken by the soil prober as the same are pressed into soil engagement during the rotation of the drum.

6. The structure of claim 4 wherein the soil probe is tubular and is provided with a constant taper from its cutting edge to its discharge end portion adjacent the peripheral surface of the drum to thus overcome the frictional drag of a core-like soil sample taken by the probe as the same is pressed into soil engagement during the rotation of the drum.

7. In combination with a vehicle adapted to travel over the ground, a soil probing device for taking intermittently spaced samples of soil from a given land area and comprising, a supporting frame connected to said vehicle for up and down movement relative thereto, said frame having a mounting portion, power means for controllably raising and lowering said frame, a soil probing assembly attached to said mounting portion and positioned for engagement with the ground when said frame is lowered, said assembly having at least one projecting tubular probe element for removing a core each time it is projected into the soil, said assembly comprising also a closed sample-receiving compartment, the interior of which is in communication with the inner end of said tubular probe element, and access means through which a multiplicity of sample cores may be removed.

8. The structure set forth in claim 7 wherein said assembly is rotatively mounted upon the frame and a plurality of said tubular probes project from the periphery thereof in circumferentially spaced relation.

9. The structure set forth in claim 7 further characterized by said soil probing assembly being mounted for rotation on a horizontal axis and said assembly having a generally circular periphery and traction means on said periphery spaced circumferentially from said probe element, said probe element and traction means effecting the revolution of said assembly when said frame is lowered and said vehicle is moved over the ground.

References Cited by the Examiner

UNITED STATES PATENTS 1,109,446 9/1914 Melberg _____ 73—425.2 X

FOREIGN PATENTS 441,434 1/1936 Great Britain.
703,171 1/1954 Great Britain.

LOUIS R. PRINCE, *Primary Examiner.*